W. S. HENRY.
ADJUSTABLE CAM.
APPLICATION FILED DEC. 1, 1914.

1,162,693.

Patented Nov. 30, 1915.

WITNESSES:
George T. Whitney
Charles F. Estruch

INVENTOR.
William S. Henry,
BY
Lyman E. Dodge
ATTORNEY.

UNITED STATES PATENT OFFICE.

WILLIAM S. HENRY, OF ROCHESTER, NEW YORK, ASSIGNOR TO GENERAL RAILWAY SIGNAL COMPANY, OF GATES, NEW YORK, A CORPORATION OF NEW YORK.

ADJUSTABLE CAM.

1,162,693.  Specification of Letters Patent.  Patented Nov. 30, 1915.

Application filed December 1, 1914. Serial No. 875,034.

*To all whom it may concern:*

Be it known that I, WILLIAM S. HENRY, a citizen of the United States, and a resident of the city of Rochester, in the county of Monroe and State of New York, have invented a new and useful Adjustable Cam, of which the following is a specification.

This invention relates to a cam capable of adjustment to any angular position with reference to its driving shaft.

The primary object of this invention is to provide a cam which can be accurately adjusted to any angular position on a shaft and which can be locked and held firmly in the adjusted position.

Other objects and advantages will appear as the description of the invention progresses, and the novel features of the invention will be particularly pointed out in the appended claims.

Figure 1:
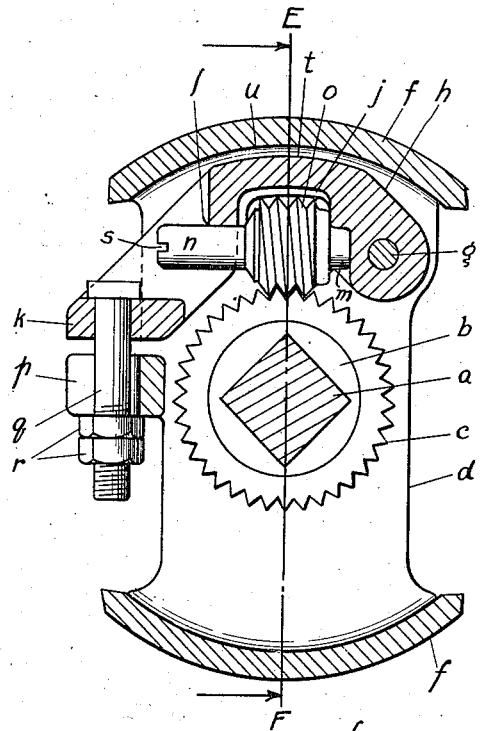
Figure 2:
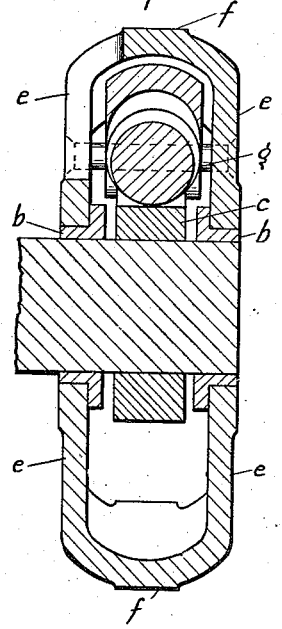

In describing the invention in detail, reference is had to the accompanying drawing wherein I have illustrated a preferred physical embodiment of my invention, and where-in like characters of reference designate similar parts throughout the several views, and in which:

Figure 1 is a sectional view taken through the middle of the cam in a plane perpendicular to the driving shaft; Fig. 2, is a cross section of the cam on the line E F, Fig. 1, looking in the direction of the arrows.

Referring to the drawing, letter $a$ designates a driving shaft which may be supported in suitable bearings and provided with any suitable means adapted to cause the shaft to turn. Two collars $b$ and toothed wheel $c$ are rigidly fastened to the shaft and a cam $d$, having sides $e$ and an operating surface $f$, is revolubly supported on the collars $b$. A pin $g$ extends through the cam parallel to the shaft $a$ and is secured rigidly to the opposite sides of the cam. An arm $h$ is disposed for the most part within the cam and is journaled on pin $g$ and formed with a cavity $j$ and has an extending lug $k$. The arm $h$ is formed with holes $l$ and $m$ which form bearings in which a shaft $n$ is journaled. The outer end of the shaft $n$ is formed with a screw driver slot therein, said slot serving as a means for causing the shaft $n$ to turn. A worm-wheel $o$ is rigidly fastened to the shaft $n$ and is located in cavity $j$, which has a screw thread on its periphery which meshes with teeth on the periphery of the toothed wheel $c$. The cam $d$ has an extending lug $p$ which is adjacent to lug $k$ on the arm $h$ and located so there is a space between the lugs. Each lug is formed with a hole, said holes being in alinement. A bolt $q$ extends through the holes in the lugs and has a head on one end adjacent lug $k$. The bolt is provided with screw threads on the other end adapted to receive nuts $r$.

By tightening the nuts $r$ the lug $k$ will be forced to move nearer lug $p$ and the arm $h$ will move toward the shaft $a$ causing the thread on worm-wheel $o$ to be forced tightly into engagement with the teeth on wheel $c$, thereby holding the arm $h$, worm-wheel $o$ and cam $d$ rigidly and incapable of rotative movement relative to the shaft.

To adjust the position of the cam relatively to the shaft the nuts are loosened and the shaft $n$ is turned by inserting a screw driver in the slot $s$, thus causing the thread on worm-wheel $o$ to be turned in the teeth of wheel $c$, causing worm-wheel $o$, arm $h$ and cam $d$ to be turned on the shaft $a$.

The arm $h$ is formed so that the distance between the surface $t$ and the inside surface $u$ of the cam is less than the depth of the teeth on wheel $c$. Arm $h$, therefore, cannot be moved far enough from wheel $c$ to allow the thread on worm-wheel $o$ to clear the top of the teeth on the wheel $c$. When the nuts $r$ are loosened the arm $h$ and cam $d$ cannot be moved through an angular distance greater than the pitch of the teeth on wheel $c$. This movement on the shaft can be made insignificant by providing teeth on wheel $c$ of extremely small pitch. Therefore, if a person should fail to lock the cam, it would be incapable of movement relative to the shaft except through a small angular distance which is less than the pitch of the teeth on wheel $c$.

The applicant has provided a locking device which will cause the cam to retain its adjustment, which locks the cam firmly to the driving shaft, and which, if left unlocked on account of neglect or carelessness, would still prevent movement of the cam relative to the shaft, except through a very small distance, which can be made insignificant.

Although I have particularly described the construction of one physical embodiment of my invention, and explained the operation and principle thereof; nevertheless, I desire to have it understood that the form selected is merely illustrative, but does not exhaust the possible physical embodiments of the idea of means underlying my invention.

What I claim as new and desire to secure by Letters Patent of the United States is:

1. Adjustable cam mechanism comprising relatively rotatable members, intermeshing worm and toothed elements carried by said respective members, and means for changing the relation of the axes of said elements, whereby said elements may be clamped into locked relationship.

2. Adjustable cam mechanism comprising relatively movable concentric members, a worm and an arcuate toothed portion carried respectively by said members and intermeshing with each other, and means for adjusting said worm toward said toothed portion.

3. Adjustable cam mechanism comprising relatively movable concentric members, one member having an arcuate toothed portion, and a worm-shaft pivotally secured to the other member and having a worm meshing with said toothed portion.

4. Adjustable cam mechanism comprising relatively movable concentric members, one member having an arcuate toothed portion, a worm-shaft pivotally secured to the other member and having a worm meshing with said toothed portion, and means for clamping said worm tightly against said toothed portion.

5. Adjustable cam mechanism comprising relatively movable concentric members, the inner member being provided with an arcuate toothed portion, an arm pivotally mounted upon the other member, and a shaft rotatably carried by said arm and having a worm-gear meshing with said toothed portion.

6. Adjustable cam mechanism comprising relatively movable concentric members, the inner member being provided with an arcuate toothed portion, an arm pivotally mounted upon the other member, a shaft rotatably carried by said arm and having a worm-gear meshing with said toothed portion, complementary clamping members carried by said arm and by said outer member, and adjustable means for drawing said members toward each other.

7. Adjustable cam mechanism comprising relatively movable members, one of which is provided with a friction or bearing surface and the other being adapted to be fixed to a shaft, said fixed member having a toothed portion, a worm shaft carried by the other member and meshing with said toothed portion, and means for tightening the worm in a direction transversely thereof against the toothed portion.

8. Adjustable cam mechanism comprising relatively movable concentric members, the inner member having a toothed periphery, the outer member forming a housing and inclosing the inner member, an arm pivotally mounted within said outer member, a worm shaft carried by said arm and meshing with said toothed periphery, and means for clamping said arm to said outer member.

WILLIAM S. HENRY.

Witnesses:
  SOPHIE LEVIN,
  LORETTA M. SPIESS.